Nov. 3, 1970     C. MAREK ET AL     3,537,302
AUTOMATIC DIGITAL FUEL INDICATOR, PARTICULARLY FOR CAR
Filed Dec. 23, 1968
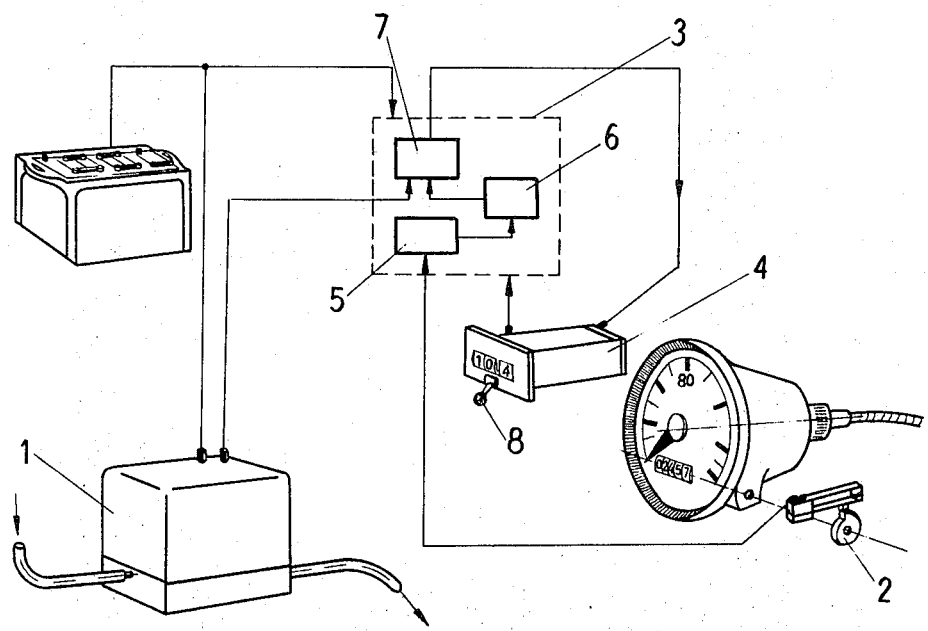

United States Patent Office 3,537,302
Patented Nov. 3, 1970

1

3,537,302
AUTOMATIC DIGITAL FUEL INDICATOR,
PARTICULARLY FOR CAR
Cywinski Marek and Mencel Jerzy, Poznan, Poland, assignors to Prezemyslowy Instytut Maszyn Rolniczych Poznan, Poland
Filed Dec. 23, 1968, Ser. No. 785,949
Claims priority, application Poland, Dec. 28, 1967,
P 124,382
Int. Cl. G01l 3/26, G01m 15/00
U.S. Cl. 73—114                             3 Claims

ABSTRACT OF THE DISCLOSURE

An internal combustion engine powered vehicle having a fuel meter in which signals proportional to batches of fuel consumed are passed through a gating circuit to a counter, the gating circuit being controlled by signals derived from a circuit interrupter responsive to distance travelled, which thereby provides pulses to a logical signal generating circuit, the output of which is connected to a computing circuit which produces the control signals for the gating circuit; a re-set circuit for the counter and the computing circuit is also provided.

This invention relates to a fuel-meter for automobiles in particular, providing direct readings in quantity consumed per unit distance travelled which may be built into automobiles assemblies and providing for an instantaneous, automatic measurement of fuel consumption during service of the vehicle. The result of measurement is obtained directly in litres per 100 km., or in other conversion units, as for instance gallons per 100 miles.

The heretofore known methods and apparatus for the measurement of fuel consumption have made the measurements under road conditions troublesome and time-consuming, being carried out by means of an automobile specially prepared for the purpose. During such tests, in addition to the driver there is usually necessary some supplementary personnel for measuring frequently the quantities of fuel batches, using for this purpose a calibrated meter, and the distance travelled by the vehicle. The final result of measurement is obtained from necessary calculations.

The fuel-meter of the present invention obviates the aforesaid imperfections and inconveniences, as it may be easily installed on any standard automobile. This will permit its user to carry out the measurement at any time and under any specific operating conditions. After actuation by the driver of the starting push-button of the instrument, its assemblies run automatically thus taking measurements and indicating their results in digital form, in units such as litres per 100 km. An automobile when fitted with this type of fuel-meter will show how much fuel the engine of the vehicle consumes when driving in town or under road conditions, under varying travelling speeds, in winter or summer time, and when using different driving modes.

The present invention fuel meter will also permit the optimum calculation to be made with regard to the direct costs for a given distance of travel, and it will also enable current evaluation of the engine system adjustment and of the general technical automobile condition.

The present fuel-meter represents quite a new item of automobile equipment and no instruments of the characteristics specified above are known to be in use in the world automobile industry. It may find a similar application in self-propelled farming machinery, rail-moving vehicles, and in floating units (crafts) powered by internal-combustion engines.

The invention referred to herein will be further explained by reference to an exemplary embodiment shown in the accompanying drawing. It consists of the following three basic members: fuel counter 1, distance recorder 2, and data processing unit 3 with electric-pulse counter 4.

The fuel counter generates binary electric signals corresponding to the successively batches of fuel passing through it.

The distance recorder 2 consists of a miniature interrupter connected to the driven wheel of the automobile odometer.

The data processing unit 3 consists of a pulsing circuit 5 which supplies a standard logical signal to the computing circuit 6 connected to an electronic gate 7, the output of which is supplied to the electronic-pulse counter 4 provided with an erasing-and-starting circuit 8.

The impulse signal corresponding to each batch of fuel taken in by the engine is transmitted to the data processing unit 3. The operation for this unit is the following: the circuit 5 receives an impulse signal from the distance recorder 2 and changes it into a standard logic signal which is transmitted to the computing circuit 6. As a result of operation of the erasing-and-starting circuit 8, the circuit 6 is set to its initial position and after receiving a signal from the pulsing circuit 5 it changes its condition causing the electronic gate 7 to open. After travelling a section of road, the condition of the computing circuit changes to the initial one after receiving the next signal from circuit 5. This causes self-locking which enables reopening of the gate after driving a certain road section. This reopening may follow after a repeated operation of the erasing-and-starting system 8.

Owing to a due selection of the quantity of fuel batch and road section corresponding to individual pulses of counter 1 and recorder 2 with the relationship expressed in litres per 100 kilometers or similar units, the amount of pulses passing through the electronic gate 7 during its opening represents the result of measurement numerically indicated by counter 4 directly in the units mentioned.

What we claim is:

1. An automatic digital fuel meter for an internal combustion engine powered vehicle comprising:
   means for generating pulses in proportion to the number of batches of fuel consumed by an internal combustion engine,
   means for generating pulses in proportion to the distance travelled by the vehicle powered by said internal combustion engine,
   means for receiving said latter mentioned pulses and for generating control signals representative of a predetermined distance travelled,
   gating means connected to said first mentioned means for receiving pulses therefrom and to said last mentioned means for receiving said control signal for permitting passage of pulses from said first mentioned means, and counter means for counting pulses from said gating means.

2. An automatic digital fuel meter as set forth in claim 1, said means for receiving pulses in proportion to the distance travelled and for generating control signals comprising pulsing circuit means for receiving pulses from said second mentioned pulse generating means and for converting said thus received pulses into a logic signal, and circuit means for receiving said logic signals and for generating a control signal.

3. An automatic digital fuel meter as set forth in claim 1, and further including manually actuated circuit means for setting said counter means to zero and for setting said control signal generating circuit means to an initial condition.

References Cited

UNITED STATES PATENTS

| | | | |
|---|---|---|---|
| 1,459,106 | 6/1923 | Knerr | 73—114 X |
| 3,118,302 | 1/1964 | Fathauer | 73—114 |

FOREIGN PATENTS 1,157,799  11/1963  Germany.

JERRY W. MYRACLE, Primary Examiner